United States Patent

[11] 3,599,316

[72] Inventor Max D. Moskal
       La Grange, Ill.
[21] Appl. No. 885,286
[22] Filed Dec. 15, 1969
[45] Patented Aug. 17, 1971
[73] Assignee Continental Can Company, Inc.
       New York, N.Y.
       Continuation-in-part of application Ser. No.
       699,038, Jan. 19, 1968, now abandoned.

[54] METHOD OF JOINING CEMENTED CARBIDE TO STEEL
     8 Claims, No Drawings

[52] U.S. Cl. .................................. 29/473.1,
                                  29/487, 29/498, 29/504
[51] Int. Cl. ............................... B23k 31/02
[50] Field of Search............................ 29/472.9,
                      473.1, 196.3, 198, 196, 487, 498, 504

[56] References Cited
UNITED STATES PATENTS

| | | | |
|---|---|---|---|
| 1,860,275 | 5/1932 | Chapin | 29/487 X |
| 1,977,845 | 10/1934 | Emmons | 29/504 X |
| 2,999,309 | 9/1961 | Kuzmick et al. | 29/198 X |
| 3,139,329 | 6/1964 | Zeller | 29/198 X |
| 3,279,049 | 10/1966 | Ellis et al. | 29/502 X |
| 3,345,734 | 10/1967 | Sowko | 29/473.1 X |
| 3,372,464 | 3/1968 | Vincent et al. | 29/472.9 X |
| 3,444,613 | 5/1969 | Foerster | 29/504 X |
| 3,471,921 | 10/1969 | Feenstra | 29/473.1 |

Primary Examiner—John F. Campbell
Assistant Examiner—Ronald J. Shore
Attorneys—Paul Shapiro, Joseph E. Kerwin and William A. Dittmann ABSTRACT: A method of making composite articles of cemented tungsten carbide and steel wherein the tungsten carbide is bonded to a steel which, during cooling, undergoes a martensitic transformation whereby the net contraction of the steel is about equal to the contraction of the carbide.

METHOD OF JOINING CEMENTED CARBIDE TO STEEL

This patent application is a continuation-in-part of my copending U.S. Pat. application Ser. No. 699,038 filed Jan. 19, 1968, now abandoned.

BACKGROUND OF INVENTION

1. Field of Invention

This invention relates to a method of joining metallic members, and more particularly to a method of making composite articles of tungsten carbide and steel.

2. The Prior Art

Tungsten carbide, due to its excellent physical properties, such as high hardness value, high melting point, high wear-resistance and cutting characteristics, has been widely used for the production of cutting and shearing tools, forming dies, and wear-resistant parts By nature, tungsten carbide is inherently brittle and not suitable by itself to function as the entire tool or die for several reasons. For example, tools made of tungsten carbide are often not practical for the stresses set up in service and also because of the excessive expense involved in making them. It has, therefore, been found desirable that only the section required for the cutting, forming, or wear-resistance surfaces be made of the tungsten carbide. For these reasons, only segments of tungsten carbide are attached to a supporting member, usually of carbon or alloy steel.

The conventional method of bonding tungsten carbide to a steel support member is generally limited to small sizes of carbide, as there is danger of the carbide cracking because of the difference in the coefficient of thermal expansion between the steel and the carbide. For example, in brazing with silver solder, a temperature of approximately 1,300° F. is employed so that the brazed parts must be cooled from 1,300° F. to obtain room temperature. The coefficient of thermal expansion of steel is approximately $6.6 \times 10^{-6}$° F. while that of cemented tungsten carbide is approximately $3.3 \times 10^{-6}$° F. or only about half of that of steel. The difference in contraction of the steel and the cemented carbide in cooling from about 1,300° F. to room temperature is in the order of $3.3 \times 10^{-6} \times 1,200$, or 0.00396 inch per inch of component length.

Thus, for example, if a platelike tungsten carbide facing member is brazed onto a platelike steel support member, the latter expands more during the heating accompanying the operation than does the tungsten carbide. As the assembly bonds together and cools, the steel support member tends to shrink to a greater extent than the tungsten carbide so that the facing has a tendency to bow and become slightly convex on the tungsten carbide side. The convexity of the tungsten carbide facing is an indication of internal stresses set up in the facing. The high residual stresses set up in the assembly during cooling effectively weaken the joint strength causing fracture, distortion, and difficulties in machining or grinding to close tolerances. For this reason, applications involving attachment of tungsten carbide facings to steel support members are limited to relatively small lengths, i.e., lengths of less than about one inch.

SUMMARY OF THE INVENTION

In accordance with the present invention, there is provided a method of producing a composite metal article of cemented tungsten carbide and steel, substantially free of distortion and stresses wherein an assembly of a tungsten carbide facing member and a steel support member having a brazing alloy interposed therebetween, is heated to a bonding temperature which exceeds the austenite transformation temperature of the steel, the steel being characterized as one in which a martensite transformation occurs at a temperature below the solidus temperature of the brazing alloy and undergoes an allotropic volume expansion during the martensite transformation. By controlling the cooling of the steel so that substantially full martensite transformation occurs, the concomitant allotropic volume expansion which occurs results in a net contraction of the steel substantially equal to the contraction of the carbide.

The cemented tungsten carbide-steel composite article produced by the method of the present invention is substantially free of distortion or stress. By the method of the present invention, relatively long pieces (i.e., greater than one inch) of cemented carbide can be brazed or otherwise bonded to steel without difficulty and without encountering distortion or cracking problems.

PREFERRED EMBODIMENTS

By the term "tungsten carbide" as used in the present specification and claims is meant tungsten carbide with and without additives, such as titanium carbide, boron carbide, tantalum carbide, and the like.

Steel materials which are utilized as support members for the tungsten carbide/steel composite articles of the present invention are steels which are capable of being transformed to a martensite crystalline structure when cooled from the austenitic structure. For most steels in this class of materials, the austenitic transformation occurs when the steel is heated above about 1,300° F. and generally over the range of 1,300°- to 1,500° F.

In order to insure substantially complete transformation of austenite to martensite, the cooling of the steel from the austenizing temperature must be carefully controlled. The cooling rate of the steel in accordance with the present invention must be controlled so that the steel upon cooling from the austenizing temperature the austenitic structure is preserved until the Ms temperature is reached. If the cooling rate of the steel is so controlled, transformation of austenite to martensite will occur upon further cooling from the Ms temperature. The Ms temperature is the temperature at which martensite begins to form in an alloy system upon cooling. For any specific grade of steel the MS temperature is primarily dependent on the steel composition. Generally the Ms temperature will be in the range of about 90° to about 500°F. During the quenching of the steel, the cooling is carried out uninterrupted from the austenizing temperature through the martensite transformation range or Ms temperature to the temperature of the quenching medium. During the stage of transformation from austenite through the Ms temperature an allotropic volume change occurs which is responsible for the substantially distortion free character of the tungsten carbide/steel composite articles of the present invention.

Cooling of the austenite and/or martensite results in thermal contraction whereas transformation of austenite to martensite results in a volumetric expansion. For example the linear expansion of 17—7Ph stainless steel upon transformation from austenite to martensite is about 0/005 in./in. The volume increase of the steel due to the martensite transformation reduces the net dimensional change of the steel due to thermal contraction, and as a result the net contraction of the steel approaches that of the tungsten carbide.

It is a critical and essential feature of the present invention that the cooling rate of the steel from the austenite state be so controlled or sufficiently rapid to prevent the austenite from decomposing into any transformation product other than martensite. Although most steels will undergo an allotropic volume increase if the austenite decomposes into a transformation product other than martensite, e.g. pearlite, the net contraction of the steel will generally be greater than that of the tungsten carbide resulting in a distorted composite article. For example it has been determined experimentally that in order to obtain a tungsten carbide/steel composite article of adequate length which is sufficiently free of distortion for acceptance in most tool applications, the difference between the net contraction of the steel support member and the net contraction of the tungsten carbide facing member must not exceed 0.002 in./in. A net contraction of less than 0.002 in./in. will be achieved if the cooling of the steel member from the austenite state is controlled and sufficiently rapid so that the austenite is transformed directly into martensite. If the cooling of the steel from the austenite state is not so controlled and a transformation product other than martensite is obtained the net contraction of the steel member will exceed the limit of 0.002 in./in.

Although most steels such as AISI-A4140, AISI-C1060, AISIC1095, will undergo a substantially full martensite transformation when cooled from the austenite state, the rapid, almost instantaneous quench in such cooling media as oil, brine, and the like which is required to achieve the substantially full martensite transformation depending on section size is obtained with some difficulty due to the skilled handling which is required.

Precipitation hardening steels or air hardening tool steels are preferred in the preparation of tungsten carbide/steel composite articles by the method of the present invention as these steels will transform directly into the martensite state when cooled in a gaseous atmosphere such as air from the austenite state. This property of direct transformation to martensite with air cooling eliminates the need for quench baths and the skilled handling that is required with low alloy steels or carbon steels which require more rapid cooling to achieve the martensite transformation. Precipitation hardening and air hardening tool steels are commercially available.

One example of a commercially available precipitation hardening steel which undergoes a direct martensite transformation on cooling in a gaseous atmosphere such as air $N_2$, argon, and the like is sold by the Armco Steel Corporation and is identified to the trade as ARMCO 17-7 stainless steel. A typical composition of such a material is as follows:

| Carbon | 0.09% Max. |
| Manganese | 1.00% Max. |
| Phosphorous | 0.04% Max. |
| Sulfur | 0.03% Max. |
| Silicon | 1.00% Max. |
| Chromium | 16.00—18.00% |
| Nickel | 6.50—7.75% |
| Aluminum | 0.75—1.50% |

The remainder is iron.

Another example of a commercially available precipitation is identified to the trade as A-L 18 NiCoMo (300). A typical composition of such steel is as follows:

| Carbon | 0.02% |
| Nickel | 18.0% |
| Cobalt | 9.0% |
| Molybdenum | 5.0% |
| Titanium | 0.6% |
| Aluminum | 0.1% |

The remainder is iron.

An example of an air hardening tool steel is AISI-type A-4. A typical composition of such a steel is as follows:

| Carbon | 1.00% |
| Manganese | 2.00% |
| Molybdenum | 1.00% |
| Chromium | 1.00% |

The remainder is iron.

In preparing tungsten carbide/steel composite articles by the method of the present invention the tungsten carbide facing member is bonded to the steel support member in any manner known to the art, such as brazing. In brazing, the tungsten carbide facing and steel support member are fluxed, a strip of brazing material is interposed therebetween, and the assembly is placed in a furnace. The temperature of the furnace is raised to above the melting point of the brazing material and the brazing operation is conducted in a vacuum or an inert atmosphere containing dry hydrogen or other reducing gas to prevent oxidation of the steel. The brazing temperature must be sufficiently high e.g. above 1,300° F. and generally in the range of 1,300° to 1,800° F. so that the steel support member undergoes a transformation to the austenitic structure. Heating of the assembly is continued for a time sufficient for a continuous layer of brazing metal to form between the opposing faces of the tungsten carbide facing member and the steel support member. When the desired continuous layer of molten brazing metal has been formed, the assembly is removed from the furnace and cooled to room temperature to obtain the martensite structure in the steel.

Suitable brazing alloys include those which meet ASTM designation B-260-56I classification BAg-3. An example of a commercially available brazing alloy which meets this ASTM specification is SILVALOY 503 sold by Engelhard Industries which has the following composition:

| Silver | 50.0% |
| Copper | 15.5% |
| Zinc | 15.5% |
| Cadmium | 16.0% |
| Nickel | 3.0% |

To illustrate the manner in which the invention may be carried out, the following example is given. It is to be understood however, that the example is for the purpose of illustration, and the invention is not to be limited to any of the specific materials or conditions recited therein.

EXAMPLE

An assembly consisting of a strip f cemented tungsten carbide (Grade 55A carbide, available from General Electric Company) having a length of 3 inches, a width of 0.5 inch, and a thickness of 0.12 inch, a strip of 17-7 PH stainless steel, having dimensions similar to the carbide, and a 0.005 inch thick strip of a silver-nickel brazing solder (0503 Silvaloy) having a length of 3 inches and a width of 0.5 inch interposed between the carbide and stainless steel strips was fluxed with a commercial fluxing material (Handy Black Flux B-1 available from Handy & Harmon Corporation) and placed in a furnace. The assembly was heated in the furnace at a temperature of 1,425°F. in an atmosphere of 90 percent nitrogen and 10 percent hydrogen for one hour. A three pound weight was placed on the brazed components during the heating period to insure intimate contact of the assembly materials. The brazed assembly was removed from the furnace and allowed to cool in air to room temperature. During cooling, the assembly was heavily bowed until a temperature of about 250°F. was reached (corresponding to the Ms temperature for the steel), whereupon the assembly began to straighten until room temperature was reached.

After cooling to room temperature, the assembly was checked for flatness, and it was found that the assembly was bowed 0.0045 inch and the face of the tungsten carbide was concave.

By way of contrast the brazing procedure of the example was repeated with the exception that AISI-Type A-4140 steel, a low alloy steel, was substituted for the 17-7 PH stainless steel of the example. AISI-Type A-4140 steel does not undergo a martensite transformation when cooled in air. When the brazed assembly was examined for flatness, it was found that the assembly was bowed 0.0185 inch and the face of the tungsten carbide was convex.

WHAT I CLAIM IS:

1. A method of reducing stress and distortion in a composite tungsten carbide-steel article which comprises heating an assembly of a tungsten carbide facing member and a steel support member having a brazing alloy interposed therebetween at a bonding temperature which exceeds the austenite transformation temperature of the steel, the steel support member being composed of a steel which undergoes a martensite transformation at a temperature below the solidus temperature of the brazing alloy, controlling the cooling of the assembly so that substantially complete martensite transformation of the steel occurs, the steel member undergoing an allotropic volume expansion during the martensite transformation whereby the net contraction between the steel and carbide members is substantially equal.

2. The method of claim 1 wherein the steel member undergoes a substantially complete martensite transformation during cooling in a gaseous atmosphere at approximately ambient temperatures.

3. The method of claim 1 wherein the tungsten carbide is bonded to the steel support member suing a brazing alloy.

4. The method of claim 1 wherein the steel is a precipitation hardening steel.

5. The method of claim 1 wherein the steel is a precipitation hardening stainless steel.

6. The method of claim 1 wherein the steel is an air hardening tool steel.

7. The method of claim 5 wherein the assembly having a silver brazing alloy interposed therebetween is heated to a temperature between about 1,300° F. to about 1,500° F., in a gaseous atmosphere, and then allowed to cool in air to about room temperature.

8. The method of claim 6 wherein the difference in net contraction between the steel and carbide members is less than 0.002 in./in.